(12) United States Patent
Mesias

(10) Patent No.: US 9,162,599 B1
(45) Date of Patent: Oct. 20, 2015

(54) MOTOR VEHICLE FOOTPAD ASSEMBLY

(71) Applicant: FORD GLOBAL TECHNOLOGIES, LLC, Dearborn, MI (US)

(72) Inventor: Diego Fabricio Villacres Mesias, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/492,369

(22) Filed: Sep. 22, 2014

(51) Int. Cl.
*B60N 3/06* (2006.01)

(52) U.S. Cl.
CPC ........................................ *B60N 3/06* (2013.01)

(58) Field of Classification Search
CPC ............... Y10T 74/20528; Y10T 74/2088; Y10T 74/2168; G10D 13/006; G05G 1/30; A63B 22/001; A63B 22/0064; A63B 2022/0017; A63B 2022/067; A63B 22/0056
USPC .................. 296/75; 74/512, 513, 560, 594.4; 280/291; 482/52, 57
See application file for complete search history.

(56) References Cited

U.S. PATENT DOCUMENTS

| | | | |
|---|---|---|---|
| 1,292,760 A | 1/1919 | Grant | |
| 4,189,976 A | 2/1980 | Becker | |
| 5,551,818 A * | 9/1996 | Koppel | 411/387.1 |
| 5,738,180 A * | 4/1998 | Hofmann et al. | 180/291 |
| 5,773,736 A * | 6/1998 | Hsieh | 84/422.1 |
| 5,913,948 A * | 6/1999 | Lien | 74/563 |
| 6,179,079 B1 * | 1/2001 | Basnett | 180/90.6 |
| 6,318,786 B1 * | 11/2001 | Sauve et al. | 296/75 |
| 6,360,629 B2 * | 3/2002 | Schambre et al. | 74/512 |
| 6,370,984 B1 * | 4/2002 | Chang | 74/563 |
| 6,626,627 B2 | 9/2003 | Oesterle et al. | |
| 6,679,135 B1 * | 1/2004 | Faigle et al. | 74/512 |
| 7,841,617 B2 | 11/2010 | Brandstatter | |
| 8,353,084 B2 | 1/2013 | Wenzel et al. | |
| 8,714,620 B1 * | 5/2014 | Meszaros et al. | 296/75 |
| 8,770,616 B1 * | 7/2014 | Draper et al. | 280/728.1 |
| 2003/0110879 A1 * | 6/2003 | Massey et al. | 74/512 |

(Continued)

FOREIGN PATENT DOCUMENTS

| | | |
|---|---|---|
| CA | 2639364 A1 | 3/2009 |
| CN | 201046679 Y | 4/2008 |

(Continued)

OTHER PUBLICATIONS

<http://www.wdshopsupply.com/door_panel_retainers.htm> downloaded Aug. 29, 2014.

*Primary Examiner* — Kiran B Patel
(74) *Attorney, Agent, or Firm* — Vichit Chea; Brooks Kushman P.C.

(57) ABSTRACT

A vehicle footrest assembly includes a bracket attached to a vehicle body structure and a foam footpad attached to the bracket. At least one fastener attaches a dead pedal to the footpad. The at least one fastener includes a head and a shank extending from the head. The shank includes a threaded portion screwed into the footpad. A collar extends radially outward from the shank and is spaced away from the head to define a clip receiving portion. One of the head and the collar are substantially frustoconical and define a lead-in surface in the clip receiving portion. The dead pedal includes at least one clip spaced apart from a pedal portion of the dead pedal. A portion of the clip is disposed within the clip receiving portion to attach the dead pedal to the footpad.

5 Claims, 3 Drawing Sheets

(56) References Cited

U.S. PATENT DOCUMENTS

| | | | |
|---|---|---|---|
| 2004/0149072 A1* | 8/2004 | Kalsi | 74/514 |
| 2005/0211012 A1* | 9/2005 | Doucet | 74/560 |
| 2006/0197356 A1* | 9/2006 | Catron et al. | 296/146.7 |
| 2007/0042875 A1* | 2/2007 | Arginsky et al. | 482/77 |
| 2007/0193394 A1* | 8/2007 | Collins | 74/512 |
| 2011/0146475 A1* | 6/2011 | Luo | 84/422.1 |
| 2012/0279346 A1* | 11/2012 | Canavan | 74/513 |
| 2013/0117969 A1* | 5/2013 | Mazur | 24/292 |
| 2013/0298752 A1* | 11/2013 | Juszkiewicz | 84/746 |
| 2014/0210227 A1* | 7/2014 | Meszaros et al. | 296/75 |

FOREIGN PATENT DOCUMENTS

| | | |
|---|---|---|
| CN | 201816492 U | 5/2011 |
| CN | 202986913 U | 6/2013 |
| EP | 0289650 A2 | 9/1988 |

* cited by examiner

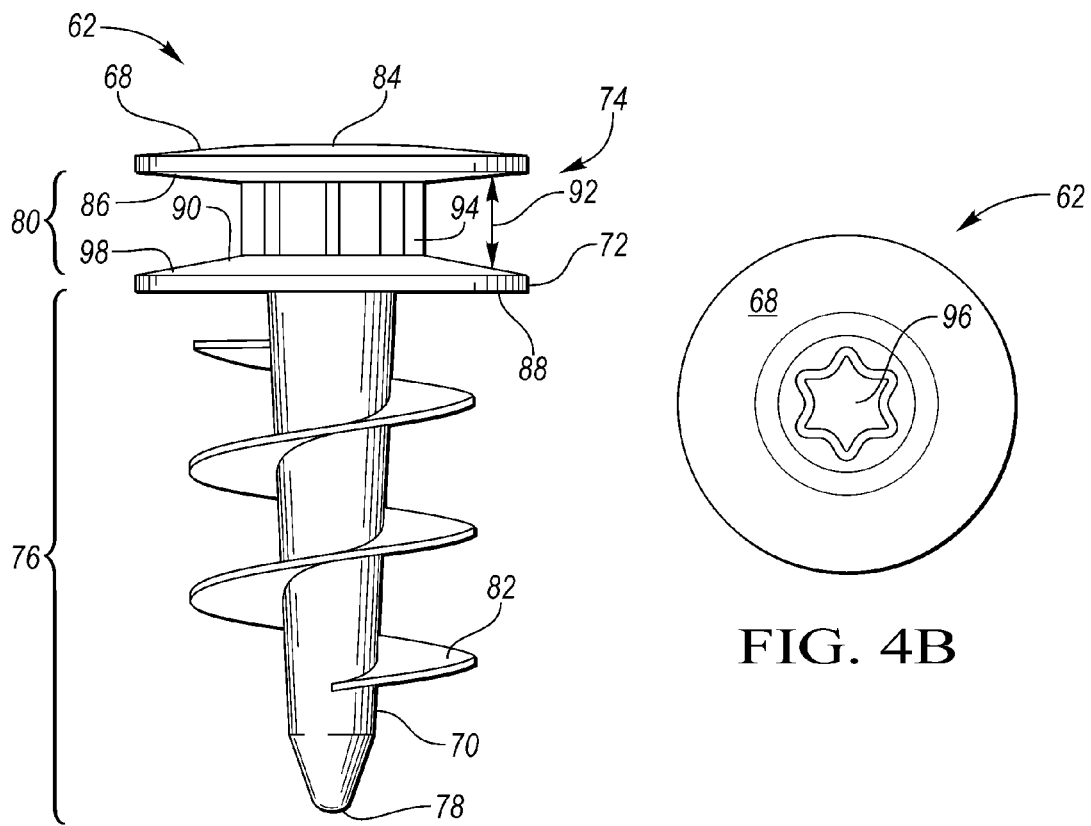
FIG. 4A
FIG. 4B
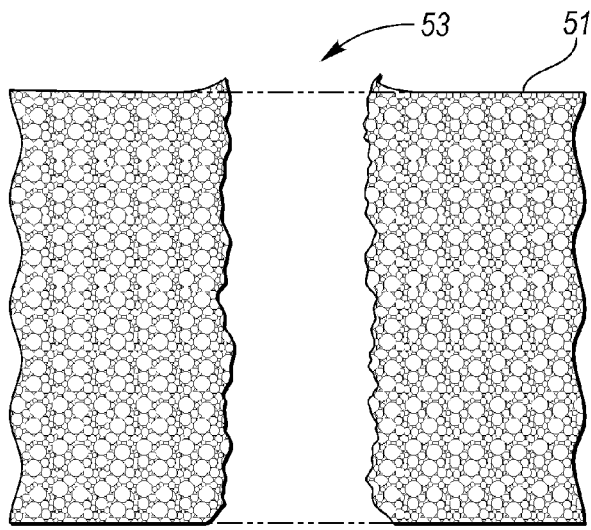
FIG. 3

MOTOR VEHICLE FOOTPAD ASSEMBLY

TECHNICAL FIELD

The present disclosure relates to motor vehicle footpad assemblies and specifically to footpad assemblies having a dead pedal attached to a foam footpad with a threaded fastener.

BACKGROUND

Motor vehicles, such as passenger cars and trucks, typically include body structures that define an interior cabin. Interior cabins include a floor pan supporting many of the components located within the interior cabin. The floor pan is partitioned into several portions including a driver foot well portion. The driver foot well portion may include a footrest for the driver's left leg and foot.

SUMMARY

According to one embodiment, a vehicle footrest assembly includes a bracket attached to a vehicle body structure and a foam footpad attached to the bracket. At least one fastener attaches a dead pedal to the footpad. The at least one fastener includes a head and a shank extending from the head. The shank includes a threaded portion screwed into the footpad. A collar extends radially outward from the shank and is spaced away from the head to define a clip receiving portion. One of the head and the collar are substantially frustoconical and define a lead-in surface in the clip receiving portion. The dead pedal includes at least one clip spaced apart from a pedal portion of the dead pedal. A portion of the clip is disposed within the clip receiving portion to attach the dead pedal to the footpad.

In another embodiment, a footrest assembly includes a foam footpad and a dead pedal attached to the footpad with a fastener. The fastener includes a head and a collar spaced apart to define a receptacle. One of the head and the collar are frustoconical and define a lead-in surface of the receptacle. The fastener includes a threaded section that is screwed into the footpad. The dead pedal includes a clip spaced apart from a pedal portion of the dead pedal. The clip and the receptacle engage to attach the pedal to the footpad.

In yet another embodiment, a footrest assembly includes a foam footpad and a dead pedal attached to the footpad with a fastener. The fastener includes a head, a collar and a threaded portion screwed into the footpad. The head and the collar are spaced apart to define a receptacle having a lead-in surface. The dead pedal includes a clip that receives the receptacle to attach the dead pedal to the footpad.

BRIEF DESCRIPTION OF THE DRAWINGS

FIG. 3 illustrates a cross-sectional view of a foam pad after removal of a traditional trim panel fastener.

FIG. 4A illustrates a front view of a fastener according to one embodiment of the present disclosure.

FIG. 4B illustrates a top view of the fastener shown in FIG. 4A.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
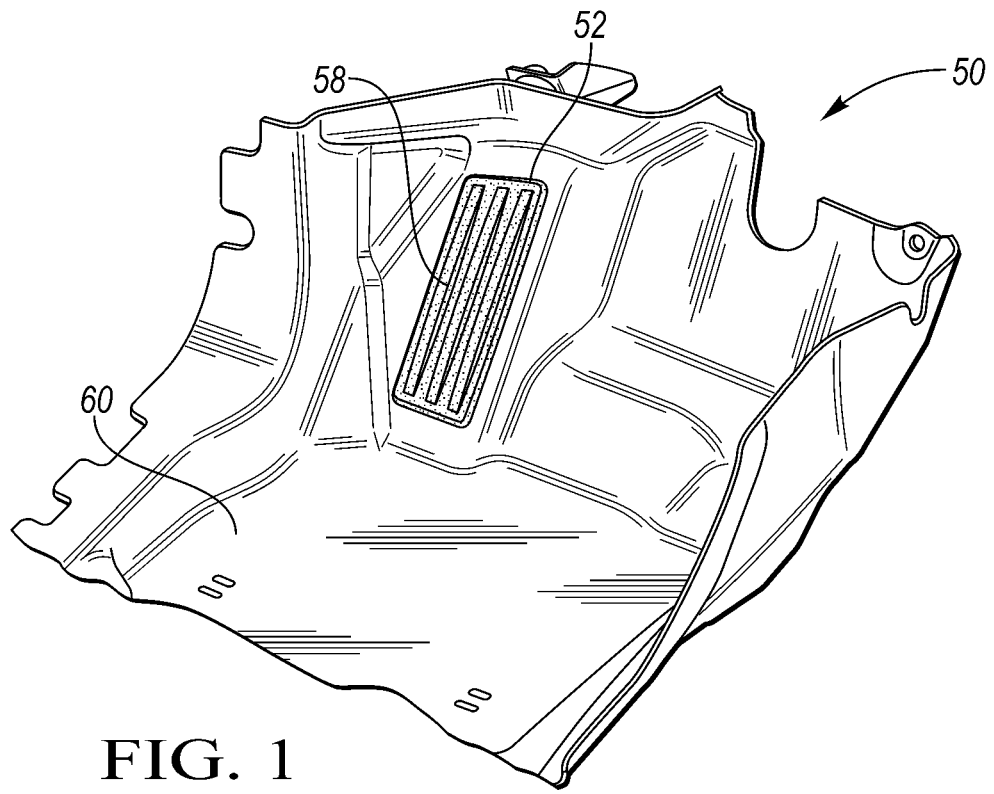
FIG. 1 illustrates a perspective view of a driver foot well including a footrest assembly.
Figure 2:
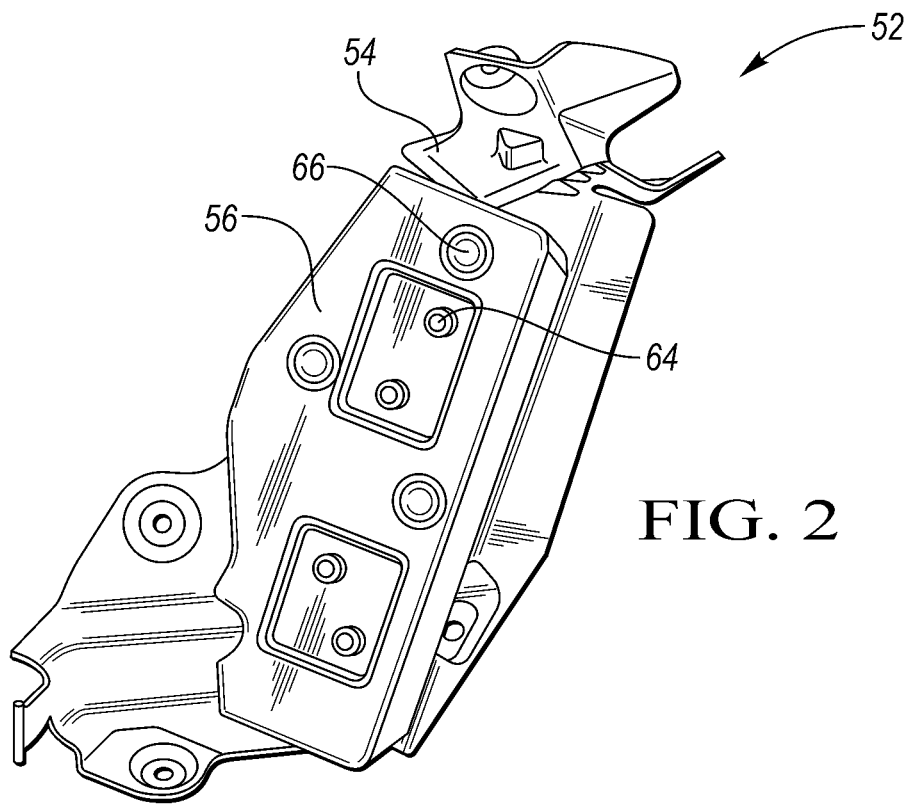
FIG. 2 illustrates a perspective view of a foam pad and a bracket of the footrest assembly.

Referring to FIGS. 1 and 2, a vehicle cabin includes a driver foot well 50. The driver foot well 50 includes a footrest assembly 52 for supporting the left leg and foot of the driver. The footrest assembly 52 may include a bracket 54 that is attached to the floor pan or other vehicle body structure. The bracket 54 forms the base of the footrest assembly 52 and supports a foam pad 56 and a dead pedal 58. The foam pad 56 may be connected directly to the bracket 54 via a plurality of pad fasteners 66. The foam pad 56 provides cushion for the footrest assembly 52 providing a more comfortable footrest for the driver. A dead pedal 58 is attached to the foam pad 56 with a plurality of fasteners (not shown). The foam pad 56 may include a plurality of boreholes 64 for receiving the fasteners, or the fasteners may be self-piercing. The dead pedal 58 defines the exposed portion of the assembly 52 and is the component directly engaging with the driver's foot. The vehicle cabin includes carpet 60 that defines the finished surface of the driver foot well 50. A portion of the carpet 60 may be disposed between the foam pad 56 and the dead pedal 58.

Inclusion of the foam footpad 56 in the footrest assembly 52 presents fastener issues. Traditional trim panel fasteners are not well suited for applications using foam. Traditional trim panel fasteners include "Christmas-tree-style" teeth. The teeth are angled towards the head allowing the fastener to be inserted into the receiving object. The angled teeth resist retraction of the fastener out of the receiving object.

Footrest assemblies, like many automotive assemblies, require disassembly for service. In order to detach the traditional trim panel fastener, force must be applied to overcome the angled teeth. The force causes the teeth to bend toward the tip of the fastener so that the fastener can be removed. In applications involving hard plastic and metal receiving objects, the receiving object is sufficiently strong to bend the teeth during removal.

However, foam is not sufficiently strong to bend the teeth. In foam applications, the foam compresses during fastener installation and rebounds after the fastener is installed. The rebounding of the foam causes the teeth of the traditional fastener to bite into the foam. Removal of the fastener causes the teeth to tear into the individual particles of the foam separating them from each other when the traditional trim panel fastener is removed.

FIG. 3 illustrates a foam receiving object 51 that has had a Christmas-tree-style fastener removed. The fastener removed irregular chunks of foam during detachment. This creates a jagged surface around a periphery of the hole 53. The hole 53 is also enlarged and cannot properly receive the fastener for reassembly. Thus, the foam receiving object 51 should be replaced during reassembly. This creates unnecessary replacement costs. What is needed is a fastener specifically designed for foam that can be assembled and disassembled without substantially affecting the foam receiving object.

FIGS. 4A and 4B illustrate a fastener 62 that is designed to solve at least the above mentioned problems. At least one fastener 62 is used to attach the dead pedal 58 to the foam pad 56. Each fastener 62 includes a head 68 and a shank 70. The head 68 may be annular. The shank 70 is attached to the head 68 and extends from the head 68 at an angle substantially perpendicular to the head 68. A collar 72 is attached to the shank 70 and extends radially outward from the shank 70. The collar 72 may be annular. The collar 72 is spaced apart from the head 68 defining a clip receiving portion or receptacle 74. The shank 70 includes a threaded section 76 defined between the collar 72 and a tip 78 of the fastener 62. The shank 70 may also include a clip section 80 defined between the head 68 and the collar 72. The threaded section 76 include threads 82 that spiral around the shank 70. The threads 82 engage with the foam footpad 56 to secure the fastener 62 to the pad. The threads allow the fastener 62 to be removed from the foam footpad 56 without tearing the pad 56. The threads may have a width of 5 millimeters (mm) and a thread pitch of 4.75 mm.

The head 68 includes an exposed side 84 and a clip engaging side 86. The collar 72 includes a pad engaging side 88 and a clip engaging side 90 that faces the other clip engaging side 86. The clip engaging sides 86, 90 define the upper and lower boundaries of the clip receiving portion 74. The clip engaging sides 86, 90 are spaced apart from each other and define a clearance 92. The clip section 80 of the shank 70 defines the inner boundary of the clip receiving portion 74.

The fastener 62 may include a socket 96 extending through the head 68 and into the shank 70. The socket 96 is configured to receive a portion of a fastener driving tool so that the fastener 62 can be screwed into the pad 56. The socket 96 may be a torx socket, an allen socket, a phillips socket, etc. The clip section 80 may include at least one reinforcing rib 94 protruding outwardly from the shank 70. The at least one reinforcing rib 94 extends between the clip engaging sides 86, 90. The reinforcing rib 94 provides additional strength around the socket 96.

The head 68 and collar 72 may be sized and shaped such that the clip receiving portion 74 has a larger clearance 92 at an entrance of the receiving portion 74 than at an interior of the receiving portion 74. An enlarged entrance allows objects to be received within the receptacle 74 more easily. The enlarged entrance may be formed by providing a lead-in surface 98 on one of the clip engaging sides 86, 90. Alternatively, both clip engaging sides 86, 90 may include a lead-in surface 98. The lead-in surface 98 may be formed by cutting a beveled edge on a corresponding clip engaging side.

Figure 5A:
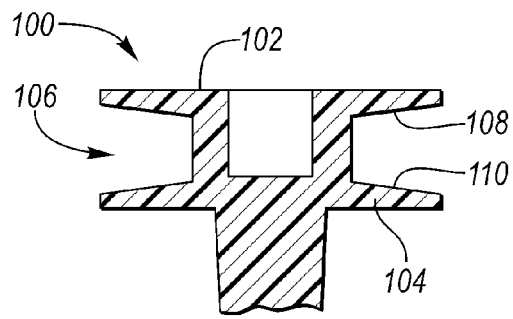
FIG. 5A illustrates a front magnified view of a fastener according to one embodiment of the present disclosure.
Figure 5B:
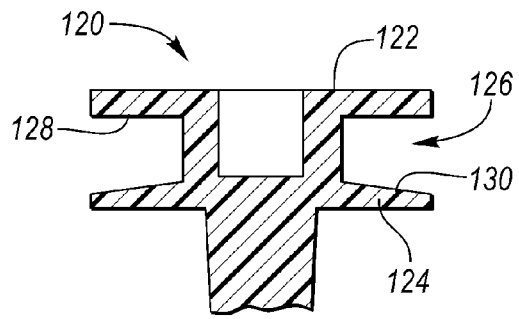
FIG. 5B illustrates a front magnified view of a fastener according to another embodiment of the present disclosure.

Referring to FIGS. 5A and 5B, different embodiments of the fastener 62 are illustrated. FIG. 5A illustrates a fastener 100 including a head 102 and a collar 104 spaced apart from the head 102 creating a clip receiving portion 106. The head 102 may be frustoconical. The frustoconical shape of the head 102 provides a lead-in surface 108.

The collar 104 may also be frustoconical and include a lead-in surface 110. The lead-in surfaces 108 and 110 cooperate to create a larger entrance into the clip receiving portion 106. The larger entrance allows objects to more easily be received within the clip receiving portion 106.

FIG. 5B illustrates another fastener 120 including a head 122 and a collar 124 spaced apart from the head 122 creating a clip receiving portion 126. In this embodiment, the head at 122 includes a substantially flat clip engaging side 128. The collar 124 is frustoconical and includes a lead-in surface 130. The lead-in surface creates a larger entrance into the clip receiving portion 126. This embodiment creates a slightly smaller entrance as compared to fastener 100 but depending upon application a larger lead-in surface may not be needed. The angle of the lead-in surfaces 108, 110, 130 may be increased or decreased depending upon design constraints. In another embodiment, the head may be frustoconical and the collar may include a clip engaging side that is substantially flat.

Figure 6A:
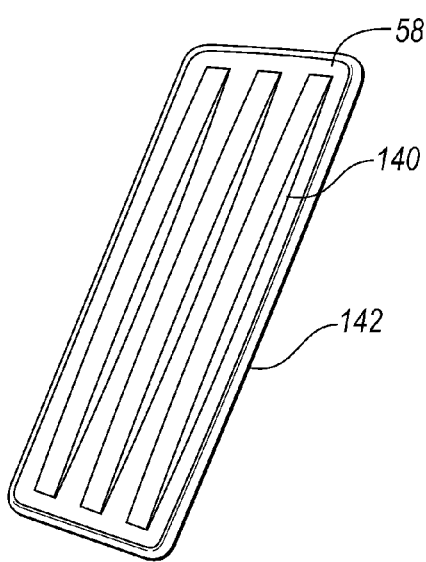
FIG. 6A illustrates a perspective view of a dead pedal.
Figure 6B:
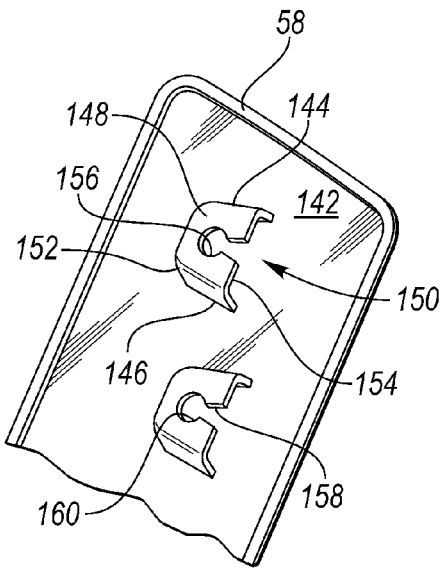
FIG. 6B illustrates a perspective view of a portion of the dead pedal.

Referring to FIGS. 6A and 6B, the dead pedal 58 includes a pedal portion having an exposed surface 140 and a hidden surface 142 opposite the exposed surface 140. The exposed surface 140 is the portion of the pedal that engages with the driver. The hidden surface 142 is the portion of the dead pedal 58 that faces the foam pad 56. The hidden surface 142 includes at least one clip 144 that connects with the at least one fastener 62 to secure the dead pedal 58 to the foam pad 56. The clip 144 may be spaced apart from the pedal portion. A portion of the clip 144 is received within the clip receiving portion 74 when the pedal 58 and the fastener 62 are connected.

In one embodiment, the at least one clip 144 is a doghouse style clip including a floor 146 that is attached to the hidden surface 142, and a ceiling 148 that is spaced apart from the hidden surface 142. The ceiling 148 may be substantially parallel to the hidden surface 142. A wall 152 connects between the floor 146 and the ceiling 148 to define a cavity 150. The wall 152 does not extend along all sides of the ceiling 148 providing an open end 154 of the cavity 150. The ceiling 148 defines a fastener cradle 156 that is preferably centered in the ceiling 148. An entrance slot 158 is formed into the ceiling 148 to provide a clear pathway, from the open end 154, through the ceiling 148, to the fastener cradle 156. The clip 144 may include a detent 160 to secure the fastener 62 in the fastener cradle 156. While described as separate elements, all elements of the doghouse clip may be integrally molded to form a continuous piece. The doghouse clip may also be integrally molded with the pedal 58.

Figure 7:
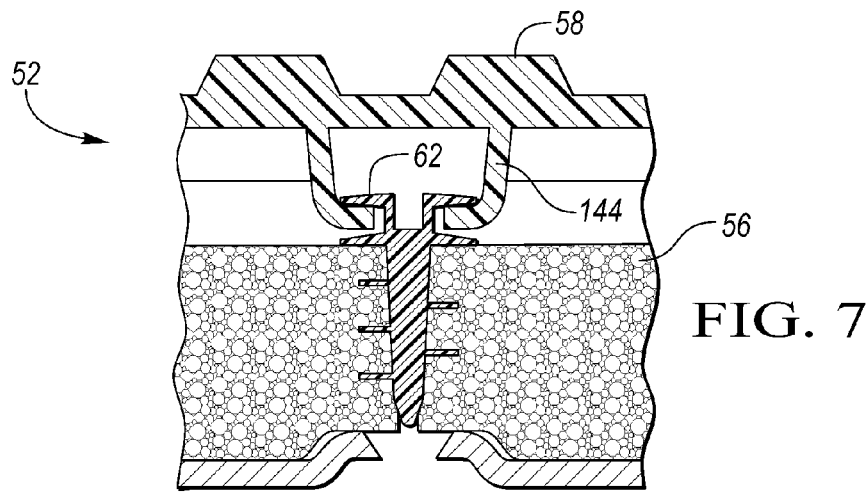
FIG. 7 illustrates a side cross-sectional view of the footrest assembly.

Referring to FIG. 7, the footrest assembly 52 may be assembled by first attaching the bracket 54 to the vehicle body structure. Then the foam pad 56 may be attached to the bracket 54. After the foam pad 56 is installed, the fasteners 62 are screwed into respective boreholes 64. The dead pedal 58 may then be installed by attaching the clips 144 to respective fasteners 62. Each clip 144 may be installed on the fastener 62 by sliding a portion of the clip 144 into the clip receiving portion 74. The at least one lead-in surface 98 provides an enlarged entrance to more easily receive the clip 144 within the receiving portion 74.

If the clip is a doghouse style clip, the clip 144 is connected to the fastener by aligning the dead pedal 58 such that the open end 154 of the doghouse clip 144 faces the fastener 62. The dead pedal 58 is then advanced towards the fasteners 62 such that the ceiling 148 is received within the clip receptacle 74 and such that the clip section 80 of the shank 70 is received within the entrance slot 158. Upon full advance, the clip section 80 is disposed within the fastener cradle 156 and the head 68 is disposed within the cavity 150. The entrance slot 158 may include a detent 160 to hold the clip 144 and fastener 62 together. The detent 160 may be located where the slot 158 and the cradle 156 meet. The detent 160 may be designed to flex upon application of sufficient force so that the dead pedal 58 may be removed from the foam pad 56. The entrance slot 158 may be flared at the opened end 154 to facilitate receiving of the fastener 62 therein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle footrest assembly comprising:
   a footpad;
   a fastener including a head and a collar spaced apart to define a receptacle having an inclined lead-in surface, and a threaded portion screwed into the footpad; and
   a dead pedal including a clip receiving the receptacle to attach the dead pedal to the footpad.

2. The assembly of claim 1 wherein the clip is disposed within the receptacle.

3. The assembly of claim 1 wherein the lead-in surface is defined in one of the head and the collar.

4. The assembly of claim 1 wherein the clip includes a doghouse defining a floor attached to the dead pedal and a ceiling spaced apart from the dead pedal, wherein the ceiling defines a fastener cradle and an entrance slot, and wherein the receptacle is received through the entrance slot and into the fastener cradle when the dead pedal is installed on the footpad.

5. The assembly of claim 1 wherein the head defines a socket cooperating with a portion of a fastener driving tool when the fastener is screwed into or unscrewed out of the footpad.

* * * * *